PROCESS FOR SEPARATING PROTEIN FROM AQUEOUS SOLUTIONS CONTAINING DISSOLVED MATERIAL OF LOWER MOLECULAR WEIGHT USING A THIN BED OF MOLECULAR SIEVE MATERIAL

Original Filed March 18, 1969 3 Sheets-Sheet 1

INVENTORS
CARL S. DIENST
JERRY M. ATTEBERY
BY
James A. Smith
ATTORNEY

PROCESS FOR SEPARATING PROTEIN FROM AQUEOUS SOLUTIONS CONTAINING DISSOLVED MATERIAL OF LOWER MOLECULAR WEIGHT USING A THIN BED OF MOLECULAR SIEVE MATERIAL

Original Filed March 18, 1969 3 Sheets-Sheet 2

INVENTORS
CARL S. DIENST
JERRY M. ATTEBERY
BY
James A. Smith
ATTORNEY

PROCESS FOR SEPARATING PROTEIN FROM AQUEOUS SOLUTIONS CONTAINING DISSOLVED MATERIAL OF LOWER MOLECULAR WEIGHT USING A THIN BED OF MOLECULAR SIEVE MATERIAL

Original Filed March 18, 1969 3 Sheets-Sheet 3

INVENTORS
CARL S. DIENST
JERRY M. ATTEBERY
BY
James A. Smith
ATTORNEY

United States Patent Office

Re. 27,806
Reissued Oct. 30, 1973

27,806

PROCESS FOR SEPARATING PROTEIN FROM AQUEOUS SOLUTIONS CONTAINING DISSOLVED MATERIAL OF LOWER MOLECULAR WEIGHT USING A THIN BED OF MOLECULAR SIEVE MATERIAL

Carl S. Dienst, Edina, and Jerry M. Attebery, Minneapolis, Minn., assignors to Emery Carlton Swanson, Minneapolis, Minn.

Original No. 3,547,900, dated Dec. 15, 1970, Ser. No. 808,189, Mar. 18, 1969. Application for reissue Sept. 27, 1971, Ser. No. 184,052
Int. Cl. A23j *1/14, 1/20*
U.S. Cl. 260—112 R 10 Claims

Matter enclosed in heavy brackets [ ] appears in the original patent but forms no part of this reissue specification; matter printed in italics indicates the additions made by reissue.

ABSTRACT OF THE DISCLOSURE

A process for the efficient separation of dissolved protein from an aqueous solution containing dissolved material of lower molecular weight, using a molecular sieve bed with a thickness between about 10 and 100 millimeters and a feed solution volume up to as much as 65 percent of the total bed volume.

This invention relates to a process for the efficient separation of proteinaceous material from lower molecular weight materials, such as salts. In one aspect this invention describes an improved process for recovering edible protein from proteinaceous solutions of low value, such as skim milk, cheese whey, brewers yeast, torula yeast and other protein containing residues resulting from manufacturing processes.

In recent years molecular sieve separation or exclusion techniques have been described as useful in fractionating mixtures of materials having differing molecular weights and dimensions. Representative of such techniques is the process of U.S. Pat. No. 3,002,823, in which the molecular sieve material in the form of gel grains selectively absorbs substances from the feed solutions. Substances with different molecular weights are distributed differently between the gel grains and the surrounding solution owing to their different ability to penetrate into the gel grains, which is dependent upon their molecular weights. The aqueous medium, i.e. the feed solution, in which the gel grains are immersed is displaced from the gel bed and thereafter aqueous liquid, normally water, is fed to the bed to displace or elute the feed solution from the bed. Successive fractions of the displaced liquid (the "effluent" or "eluate") flowing out of the bed are collected, whereby there is obtained at least one fraction which contains a major portion of substance of larger molecular size, and at least one subsequent fraction containing a major portion of the substance of smaller molecular size. Various gel materials (e.g. dextran gel) may be used in such process.

More recently such molecular sieve separation techniques have been employed in the separation of edible protein from the salts in skim milk and cheese whey. In the brochure entitled "Gel Filtration, a New Way of Recovering Protein From Milk and Whey," a sales information bulletin (SIO92E/3) of Alfa-Laval Co., a cheese whey is initially concentrated to about 23% solids and is fed onto the bed of molecular sieve grains. After the feed is absorbed into the bed, water is used to elute the protein molecules from the entrapped salts. Although effective separations can be realized this process has several disadvantages, including a tendency for the feed to cause a plugging of the bed, inefficient use of the molecular sieve material, etc.

Each protein has a definite and characteristic solubility in an aqueous solution of fixed salt concentration and pH. Under a given set of conditions the amount of protein that may be dissolved to form a saturated solution at equilibrium is independent of the amount of excess undissolved protein suspended in the medium. That the solubility of globular protein is influenced by pH might be expected from their amphoteric behavior. Solubility is at a minimum at the isoelectric point and increases as the pH becomes more acidic or basic. When protein molecules exist predominantly as either anions or cations, repulsive forces are high, and the molecules will be more soluble than at the isoelectric point. For example, the solubility of beta-lactoglobulin, the major protein constituent of cheese whey, varies as a function of salt concentration. The solubility is markedly enhanced by increased salt concentration and is minimal near the isoelectric point of 5.2–5.4 pH. Globulins as a class of proteins are sparingly soluble in water, and their solubility is significantly increased by the presence of neutral salts. Globulins, in fact, can often be precipitated by dilution of a protein solution with distilled water. This action of neutral salts, such as neutral alkali metal or alkaline earth metal salts, in increasing the solubility of globulin is termed the "salting in" effect.

In the known molecular sieve separation of milk proteins from cheese whey, mentioned earlier, applicants believe that the gradual removal of the salts from the protein as the whey feed moves through the bed of molecular sieve material can cause insolubilization of the protein and that this effect may explain the tendency toward lower bed efficiency due to a decreasing flow rate (or higher pressure drop across the separation bed), plugging of the bed, longer separation cycles, less efficient use of the molecular sieve material, etc. In some instances these problems may require the use of a whey feed with lower solids content (the abovementioned sales information brochure suggests the use of a whey feed having 22.8% dry solids in a bed of molecular sieve material from 60 to 150 cm. in height) and/or a lower bed loading (i.e. 30% or below).

Figure 1:
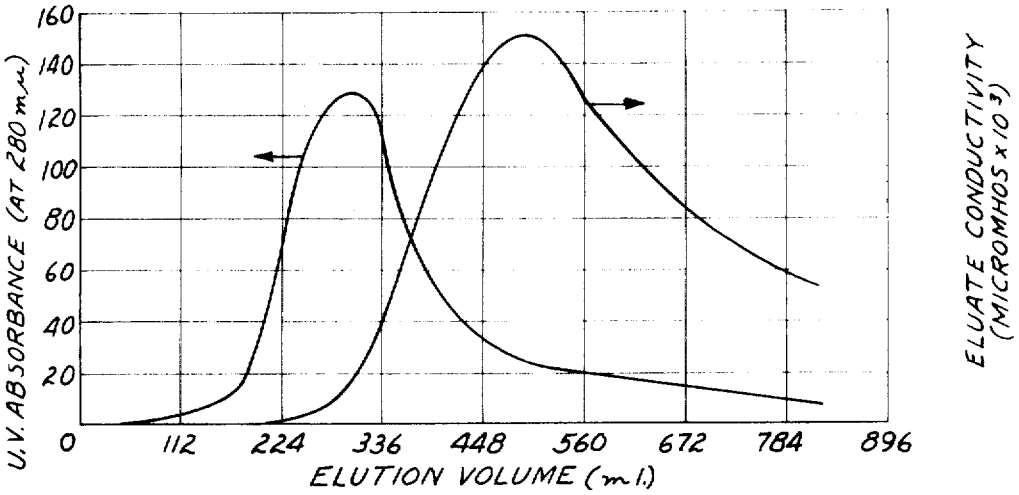
FIG. 1 is a plot of UV absorbance and eluate conductivity vs. elution volume.

It has now been found that at least some of the aforementioned disadvantages in protein separation from salts can be overcome by the use of a thin bed of molecular sieve particles capable of separating protein from salt molecules, using a bed thickness (or height) of from 10 to 100 millimeters (preferably 10 to 60 mm.), and a bed loading (i.e. volume of proteinaceous liquid feed/total bed volume, including both particles and bed voids, expressed as percent) from above 25% to 65% (preferably 30% to 50% and most preferably above 30%). Although the solids content of the liquid feed solution is limited only by the need for a viscosity sufficient to permit the feed to pass through the bed of molecular sieve material (which will depend on molecular sieve particle size, bed packing, pressure drop considerations, etc.), the feed solutions generally contain a solids content up to about 45% total weight of dry solids (preferably with a minimum of at least 20%, most preferably at least 25%) when cheese wheys are used. This "thin bed" process improves the operating efficiency of the protein separation process while retaining the capability of producing a high protein yield or protein purity. By varying the total volume of eluate collected as it emerges from the bed, it is possible to control the percent protein yield or the percent protein purity (i.e. amount of recovered protein in the total solids in the eluate). This control can be conveniently accomplished by measuring or monitoring the conductivity of the eluate, which is an indication of the salt concentration, or by ultraviolet absorbance, which is an indication of the protein concentration, as will be discussed later.

In the operation of this process the aqueous proteinaceous feed solution is introduced into a bed of molecular sieve material having pores of a size permitting the penetration only of molecules smaller than the protein, entrapping those smaller molecules in the molecular sieve material, forcing the dissolved protein through the bed in the liquid outside the molecular sieve material, eluting the protein selectively from the bed, and recovering the protein containing eluate. With the thin beds of this invention it is important to carefully introduce the feed onto the bed to avoid channeling or bed disruption. Use of a perforated distribution plate is one means for maintaining bed integrity and uniformly bringing the feed solution into contact with the input surface of the bed, although different techniques may be used with various equipment, e.g. centrifuge, column, vacuum or pressure filter, etc. Further detailed description of equipment useful for molecular sieve separation appears in the literature. As in any molecular sieve separation process, means for accurately sampling and collecting the eluate must be provided. With the relatively brief cycles of the thin beds it is even more essential that the collection of eluate can be essentially instantaneousy terminated to achieve optimum fractionation.

Any molecular sieve material which does not degrade or contaminate the protein containing liquid and which selectively entraps molecules smaller than protein can be used in the bed. A molecular sieve having an exclusion limit with globular proteins of from 5,000 to 30,000 molecular weight is particularly preferred for separating whey protein from the lactose and salt components since about 76% of cheese whey protein has a molecular weight above 30,000. One of the most satisfactory of molecular sieve materials is a stable modified dextran gel composed of crosslinked linear macromolecules in a three dimensional network of polysaccharide chains. Such modified dextran molecular sieves and their preparation are described in U.S. Pat. Nos. 3,042,667 and 3,208,994 and in "Sephadex-Gel Filtration in Theory and Practice," a product booklet published in December 1966, by Pharmacia Fine Chemicals of Uppsula, Sweden. Dextran gel molecular sieve materials are available from Pharmacia Fine Chemicals, Inc. under the registered trademark "Sephadex." For separation of protein Sephadex G-25, which has an approximate limit for complete exclusion of about 5,000 molecular weight, and Sephadex G-50, which has an approximate limit for complete exclusion of about 30,000 molecular weight, may be used. Dry Sephadex G-25 will take up about 2.5 times its weight of water over a period of hours to form a gel. Sephadex G-50 will take up about 5 times its weight of water. Molecular sieve materials in the size range of 50 microns to 300 microns, measured dry, are particularly useful in the whey treatment process of this invention, with preferred results normally obtained within a size range of about 50 to 150 microns.

Although the process of this invention is applicable to any aqueous proteinaceous solution having dissolved material of lower molecular weight than the protein (such as salts), skim milk and cheese wheys, e.g. cottage cheese whey and cheddar cheese whey, are readily available at low cost and are therefore advantageously employed in the "thin bed" process. Brewers yeast, soy whey, animal blood, fermentation media containing protein from microbiological action, and torula yeast may also be treated by this process.

The efficiency of molecular sieve protein separation from aqueous salt-containing solutions can be improved in most instances by pretreatment to remove insolubles and material of a higher molecular weight than the protein, particularly lipids and/or lactose if a milk derivative is used as the feed. Many methods for lactose removal, e.g. by crystallization or precipitaion, are known, see U.S. Pat. Nos. 2,088,606; 2,116,931; 2,129,222; 2,477,-558; 2,768,912 and 2,778,750. Similarly, techniques for the removal of lipids or casein-lipid complexes have been known, e.g. see U.S. Pat. No. 2,606,181.

Based on data obtained with bed thicknesses varying from 5 to 40 mm. it has been found that conductivity measurements on the liquid eluted from the bed correlate effectively with the concentration of low molecular weight material (essentially salts and lactose). FIG. 1 illustrates the relative elution pattern of protein (represented by ultraviolet light absorbance at 280 millimicrons) and low molecular weight material (represented by conductivity) from a 30 mm. thick bed of G-50 medium Sephadex molecular sieve material, using a 25% bed loading and 112 ml. cottage cheese whey feed (40 weight percent total solids, pretreated to remove lipids and lactose and reconstituted from spray dried whey powder) followed by water. Low molecular weight material (also referred to herein as "salt") appeared at a total elution volume of 297 ml.

Figure 2:
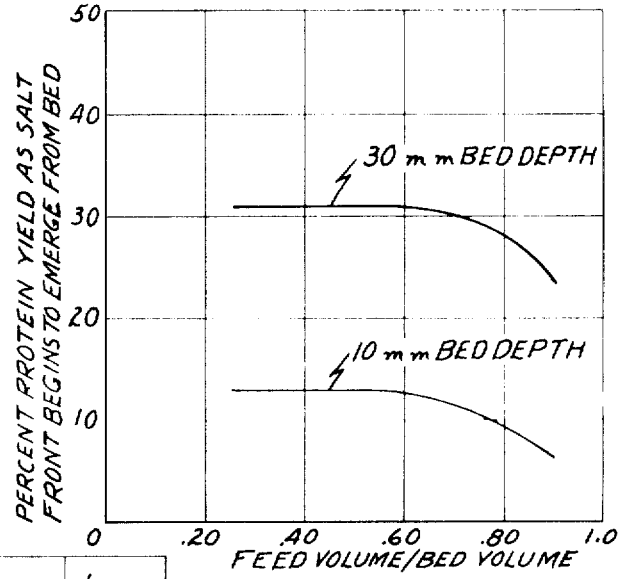
FIG. 2 is a plot of bed loading vs. percent of total protein recovered before salt peak began to emerge.

At a given bed loading the protein and salt molecules pass through a thin bed, regardless of the actual bed depth, in a fixed relationship to each other than is related to their molecular weights and their individual velocities in the mobile phase. FIG. 2 shows the effect on the total protein percent recovery (before the salt emerged from the bed) of varying bed loadings at bed thicknesses of 10 mm. and 30 mm. and using a 40% solids feed, as in FIG. 1. Above about 65% bed loading the ability of the bed to separate protein molecules and salt begins to decrease, although the separation efficiency is essentially independent of bed loading over the 20% to 65% range. It can be concluded that, when the protein and salt are present in the same ratio in the whey feed, the percent protein recovery is essentially the same within these bed loading limits.

ELUTION PATTERNS IN THIN BEDS

Figure 3:
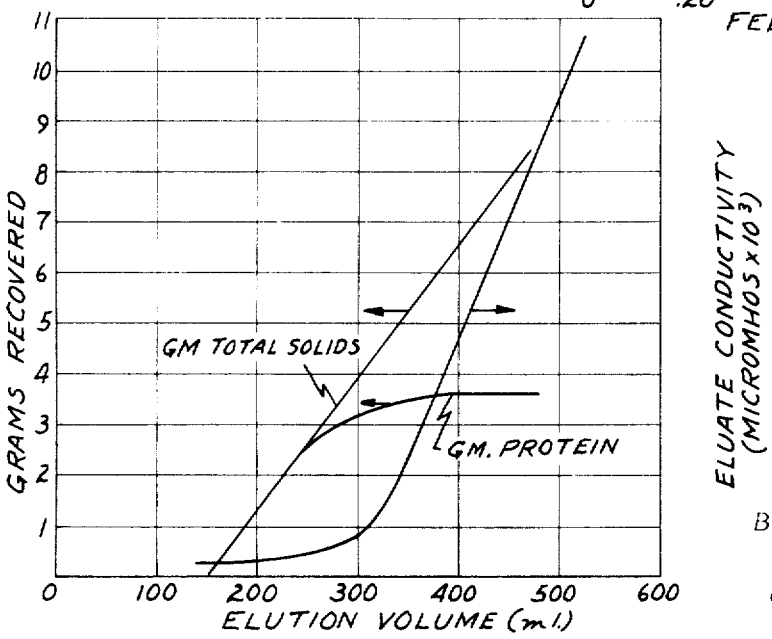
FIG. 3 is a plot of grams protein, grams total solids and eluate conductivity vs. elution volume.
Figure 4:
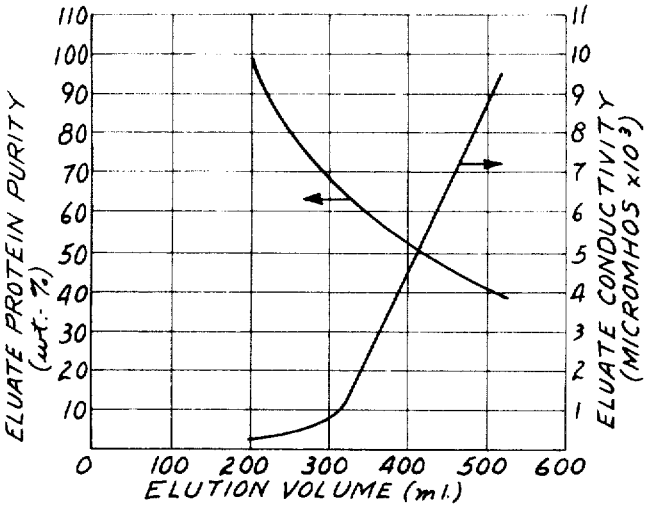
FIG. 4 is a plot of eluate protein purity and eluate conductivity vs. elution volume.

A series of runs were made with a 30 mm. thickness of dextran gel (G-50 medium Sephadex, 50-150 micron particle diameter) using 112 ml. (40 weight percent solids, same feed as used earlier for the data in FIGS. 1 and 2) of cottage cheese whey (25% bed loading) and a subsequent elution with water. The cross sectional area of the bed was 5027 cm.$^2$. As shown in FIG. 3 protein begins to emerge immediately as the solids content in the eluate samples rises. Essentially all of the protein was eluted when the conductivity of the accumulated and combined eluate samples reached about 3500 micromho, and the protein purity at a conductivity of 3500 micromho was about 55 weight percent, as shown in FIG. 4.

Figure 5:
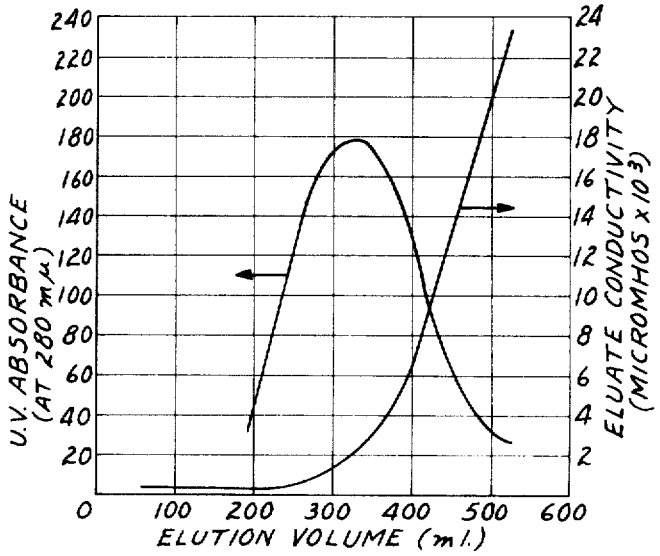
FIG. 5 is a plot of UV absorbance and eluate conductivity vs. elution volume.
Figure 6:
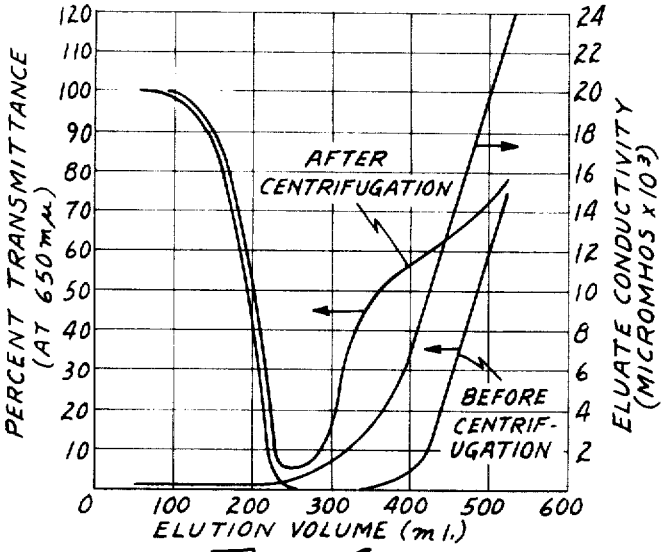
FIG. 6 is a plot of percent transmittance and eluate conductivity vs. elution volume.
Figure 7:
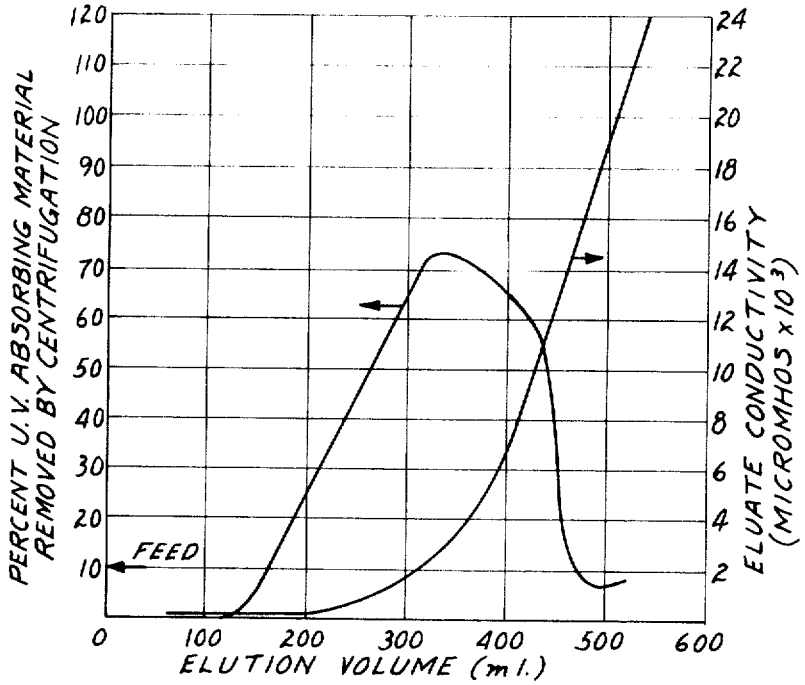
FIG. 7 is a plot of percent UV absorbing material removed by centrifugation and eluate conductivity vs. elution volume.
Figure 8:
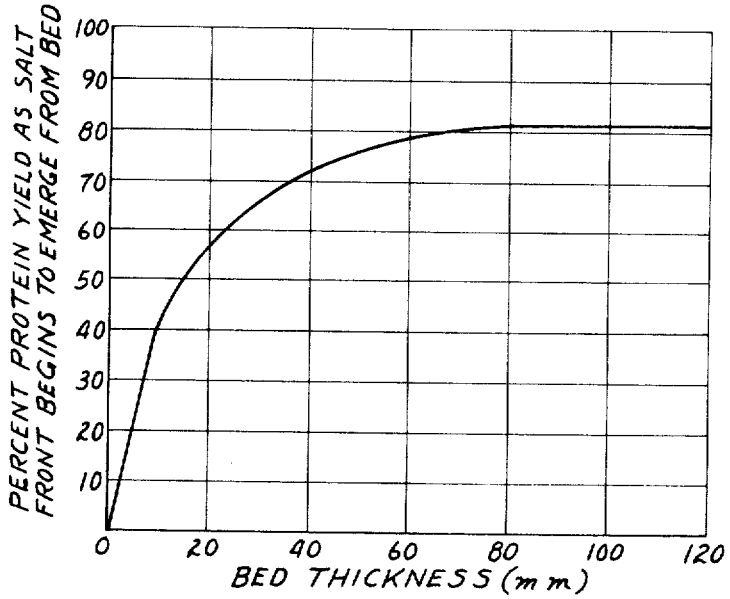
FIG. 8 is a plot of bed depth vs. percent protein yield as salt front begins to emerge from bed.

In another similar series of runs the ultraviolet light absorbance (280 millimicrons) and percent transmittance of the eluate samples were measured, both before and after the samples were centrifuged for 90 minutes at 2400 revolutions per minute. As mentioned earlier, ultraviolet absorbance relates directly to the protein concentration, and percent transmittance relates inversely to amount of insoluble protein. It is apparent from the data reported in FIGS. 5–7 that a significant portion of the protein eluted from the bed in advance of the salt is insolubilized to the extent that it can be precipitated out of the turbid solution by centrifugation, and substantial amounts of a white precipitate were observed in the centrifugal tube. As shown in FIG. 8, under the same conditions a bed thickness of about 90 mm. was sufficient to give about 80% protein yield (measured by UV absorbance at 280 millimicrons) before salt begins to emerge from the bed. The emergence of the salt front is taken as the inflection point or "half height" of the rising part of the salt elution curve, as reported in the "Sephadex-Gel Filtration in Theory and Practice," page 48, cited earlier.

Although the percent protein yield increases without a significant variation in protein purity up to a bed thickness of about 90–100 mm., bed thicknesses in the lower portion of this range, i.e. 10–60 mm., may be preferred if a high protein yield is not desired or if the eluate is recycled or reintroduced (usually after reconcentration) into another thin bed of molecular sieve material for further separation. A greater bed thickness (i.e. above 100 mm.) under these conditions results in greater protein insolubilization within the bed itself, which tends to reduce the protein flow rate (and accordingly reduce its separation from salt) and to plug the bed or encourage channeling of the flow through the bed. Any fat or lipid in the whey feed can further complicate the desired separation at bed thicknesses above about 100 mm.

Flow rates through the thin beds of this invention can vary widely, depending on factors such as bed thickness, bed void volume, viscosity of liquid feed, etc. Generally, however, flow rates under about 8.5 cm./second are most useful, with flow rates around 3 cm./second being preferred for a 30 mm. bed thickness.

COMPARATIVE PERFORMANCE DATA SHOWING EFFECT OF BED THICKNESS

Tables I and II present comparative data on the effect of bed thickness in whey treatment. Conventional bed thicknesses were used in runs 1–10, and the thin beds were used in runs 11–15. In runs 11–15 a square bed cross section (70.87 cm. x 70.87 cm.) was used. Runs 1–12 used cheese whey feed, at a solids content of about 23% for runs 1–10 and at a solids content of about 40% for runs 11 and 12. The feed for runs 11 and 12 were penetrated to remove lipids and lactose. Raw cottage cheese whey at 23% solids was used as feed in run 13. The feed in runs 14 and 15 were cheddar cheese whey at 20% solids and raw soy whey at 20% solids, respectively. The data for runs 1–10 has been obtained from the Alfa-Laval sales information bulletin discussed earlier.

A comparison of runs 7–9 with 11–13 illustrates the difference in the operating results with approximately the same surface area of molecular sieve material ("Sephadex" G–50 medium) in the bed. For example, with beds having a surface area of 5023 cm.$^2$ (i.e. runs 8 and 11–13) and at 2.36 cycles per hour those runs using thin beds (i.e. runs 11–13) show from 18% to about 500% increase in kilograms of protein per hour per 500 liters of bed volume over that of the comparable conventional bed (i.e. run 8), depending on the feed composition, and the increase in kilograms protein per kilogram resin per hour ranges from 644% to 3500%. By appropriate selection of the eluate fraction the protein purity of product obtained from the thin bed can be as high as that of the thicker bed. Since the number of cycles per hour can be more readily increased with the thinner beds, these advantages can be enhanced accordingly.

It is apparent that the thin bed process constitutes a significant improvement over the conventional process and offers the added flexibility and efficiency so important to commercial success.

TABLE I

| Run | Diameter (cm.) | Height (cm.) | Bed volume (liters) | Charge/cycle as percent of bed volume | Surface area (cm.$^2$) | Charge volume (cm.$^3$×10$^3$) | Surface area per charge (cm.$^3$/l.) | Thickness of charge liquid (cm.) | Surface area/bed depth | Height/diameter |
|---|---|---|---|---|---|---|---|---|---|---|
| 1 | 40 | 60 | 75 | 25.4 | 1,255 | 19 | 66.0 | 15.1 | 21.0 | 1.50 |
| 2 | 40 | 100 | 125 | 24.8 | ---------- | 31 | 40.5 | 24.7 | 12.6 | 2.50 |
| 3 | 40 | 150 | 185 | 25.4 | ---------- | 47 | 26.7 | 37.5 | 8.4 | 3.80 |
| 4 | 60 | 60 | 170 | 25.3 | 2,810 | 43 | 64.0 | 15.3 | 46.8 | 1.00 |
| 5 | 60 | 100 | 280 | 25.0 | ---------- | 70 | 40.2 | 24.9 | 28.1 | 1.67 |
| 6 | 60 | 150 | 420 | 25.0 | ---------- | 105 | 26.8 | 37.4 | 18.8 | 2.50 |
| 7 | 80 | 60 | 300 | 25.0 | 5,020 | 75 | 67.0 | 14.9 | 83.7 | 0.75 |
| 8 | 80 | 100 | 500 | 25.0 | ---------- | 125 | 40.2 | 24.9 | 50.2 | 1.25 |
| 9 | 80 | 150 | 750 | 25.1 | ---------- | 188 | 26.7 | 37.5 | 33.5 | 1.88 |
| 10 | 180 | 100 | 2,500 | 25.0 | 25,450 | 625 | 40.7 | 24.6 | 254.5 | 0.56 |
| 11 | *70.87 | 3 | 15.1 | 30.0 | 5,023 | 4.53 | 1,109 | 0.902 | 1,674 | 0.042 |
| 12 | *70.87 | 4 | 20.1 | 30.0 | 5,023 | 6.03 | 833 | 1.20 | 1,256 | 0.056 |
| 13 | *70.87 | 3 | 15.1 | 30.0 | 5,023 | 4.53 | 1,109 | 0.902 | 1,674 | 0.042 |
| 14 | *70.87 | 3 | 15.1 | 25.0 | 5,023 | 3.77 | 1,332 | 0.75 | 1,674 | 0.042 |
| 15 | *70.87 | 3 | 15.1 | 36.0 | 5,023 | 5.44 | 923 | 1.08 | 1,674 | 0.042 |

*70.87 cm. square cross section.

TABLE II

| Run | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Diameter (cm.) | 40 | 40 | 40 | 60 | 60 | 60 | 80 | 80 | 80 | 180 | *70.87 | *70.87 | *70.87 | *70.87 | *70.8 |
| Height (cm.) | 60 | 100 | 150 | 60 | 100 | 150 | 60 | 100 | 150 | 100 | 3 | 4 | 3 | 3 | 3 |
| Kg. dry resin per bed | 15 | 25 | 37 | 34 | 56 | 84 | 60 | 100 | 150 | 500 | 1.51 | 2.01 | 1.51 | 1.51 | 1.51 |
| Kg. charge per cycle | 20.4 | 33.3 | 50.5 | 46.2 | 75.3 | 112.9 | 80.6 | 134.4 | 202.1 | 671.9 | 5.35 | 7.12 | 4.80 | 4.03 | 5.82 |
| Kg. protein per cycle | 0.51 | 0.83 | 1.26 | 1.16 | 1.88 | 2.82 | 2.02 | 3.36 | 5.05 | 16.8 | 0.58 | 0.77 | 0.12 | 0.202 | 0.27 |
| Kg. solids per cycle | 4.65 | 7.59 | 11.5 | 10.5 | 17.2 | 25.7 | 18.4 | 30.6 | 46.1 | 153.2 | 2.30 | 3.06 | 1.09 | 0.806 | 1.16 |
| Kg. solids/kg. resin per cycle | 0.31 | 0.30 | 0.31 | 0.31 | 0.31 | 0.31 | 0.31 | 0.31 | 0.31 | 0.31 | 1.52 | 1.52 | 0.722 | 0.534 | 0.768 |
| Kg. protein/kg. resin per cycle | 0.034 | 0.033 | 0.034 | 0.034 | 0.034 | 0.034 | 0.034 | 0.034 | 0.034 | 0.034 | 0.384 | 0.383 | 0.079 | 0.134 | 0.179 |
| Cycles per hour | 5.90 | 2.81 | 1.57 | 4.53 | 2.50 | 1.29 | 4.13 | 2.36 | 1.22 | 2.38 | | | | | |
| Kg. solids/kg. resin per hour | 1.83 | 0.84 | 0.49 | 1.40 | 0.78 | 0.40 | 1.28 | 0.73 | 0.38 | 0.74 | 1.85(a)<br>304(b)<br>3.59(c)<br>4.56(d)<br>6.08(e) | 1.85(a)<br>3.04(b)<br>3.59(c)<br>4.56(d)<br>6.08(e) | 0.881(a)<br>1.44(b)<br>1.70(c)<br>2.17(d)<br>2.89(e) | 0.651(a)<br>1.67(b)<br>1.26(c)<br>1.60(d)<br>2.14(e) | 0.937(a)<br>1.54(b)<br>1.81(c)<br>2.30(d)<br>3.07(e) |
| Kg. protein/kg. resin per hour | 0.200 | 0.096 | 0.053 | 0.154 | 0.027 | 0.014 | 0.044 | 0.025 | 0.013 | 0.025 | 0.47(a)<br>0.77(b)<br>0.91(c)<br>1.15(d)<br>1.54(e) | 0.47(a)<br>0.77(b)<br>0.91(c)<br>1.15(d)<br>1.54(e) | 0.096(a)<br>0.158(b)<br>0.186(c)<br>0.237(d)<br>0.316(e) | 0.160(a)<br>0.268(b)<br>0.316(c)<br>0.402(d)<br>0.536(e) | 0.218(a)<br>0.358(b)<br>0.422(c)<br>0.537(d)<br>0.716(e) |

See footnote at end of table.

TABLE II—Continued

| Run | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Kg. protein/hour per 500 liter bed volume | | | | | | | | 7.92 | | | 23.6(a) | 23.4(a) | 4.83(a) | 8.14(a) | 10.9(a) |
| | | | | | | | | | | | 38.6(b) | 38.3(b) | 7.94(b) | 13.4(b) | 17.9(b) |
| | | | | | | | | | | | 45.6(c) | 45.3(c) | 9.37(c) | 15.8(c) | 21.1(c) |
| | | | | | | | | | | | 57.9(d) | 57.5(d) | 11.92(d) | 20.1(d) | 26.8(d) |
| | | | | | | | | | | | 77.2(e) | 76.6(e) | 15.9(e) | 26.7(e) | 35.7(e) |
| Kg. solids/hour per 500 liter bed volume | | | | | | | | 72.2 | | | 93.6(a) | 92.8(a) | 44.0(a) | 32.5(a) | 49.0(a) |
| | | | | | | | | | | | 153.2(b) | 152.3(b) | 72.2(b) | 53.3(b) | 76.8(b) |
| | | | | | | | | | | | 179.8(c) | 179.6(c) | 85.0(c) | 62.9(c) | 90.7(c) |
| | | | | | | | | | | | 229.8(d) | 228.4(d) | 108.2(d) | 80.1(d) | 115.2(d) |
| | | | | | | | | | | | 306.4(e) | 304.5(e) | 144.3(e) | 106.6(e) | 153.6(e) |

*70.87 cm. square cross section.
(a) = Results at 1.22 cycles/hr.
(b) = Results at 2 cycles/hr.
(c) = Results at 2.36 cycles/hr.
(d) = Results at 3 cycles/hr.
(e) = Results at 4 cycles/hr.

What is claimed is:

1. A process for the recovery of dissolved protein from an aqueous solution *thereof also* containing soluble material having a lower molecular weight than said protein which [comprises] *consists of the following steps*:

(a) introducing said solution as a feed into a bed of molecular sieve material having pores of a size permitting the penetration only of molecules smaller than said protein, said bed having a thickness of from about 10 to about 100 millimeters, the ratio of the total volume of said solution to the volume of said bed being above 25% and no more than about 65%;

(b) entrapping in said molecular sieve material molecules smaller in size than said protein[;] *while* [(c)] forcing said dissolved protein through said bed in the liquid outside said molecular sieve material[;], *thereby* [(d)] eluting said protein selectively from said bed; and

[(e)] (*c*) recovering the protein containing eluate.

2. The process of claim 1 in which the bed thickness is from about 10 to about 60 mm.

3. The process of claim 1 in which said feed solution is a milk derivative from which a substantial portion of the lactose and lipids have been removed.

4. The process of claim 1 in which said feed solution is a cheese whey.

5. The process of claim 1 in which said feed solution is a cottage cheese whey.

6. The process of claim 1 in which said feed solution is a cheddar cheese whey.

7. The process of claim 1 in which said feed solution is a soy whey.

8. The process of claim 1 in which said ratio of total volume of said solution to the volume of said bed is from 30 to 50%.

9. The process of claim 1 in which said ratio of total volume of said solution to the volume of said bed is above 30%.

10. The process of claim 1 in which the elution of said protein is terminated when the electrical conductivity of said eluate reaches a predetermined value.

References Cited

The following references, cited by the Examiner, are of record in the patented file of this patent or the original patent.

UNITED STATES PATENTS

| | | | |
|---|---|---|---|
| 3,573,271 | 3/1971 | Nielsen | 260—112 |
| 3,002,823 | 10/1961 | Flodin et al. | 260—112 X |
| 3,476,737 | 11/1969 | Emmeus et al. | 260—112 |
| 3,487,064 | 12/1969 | Swanson et al. | 260—112 |

OTHER REFERENCES

Sephadex-Gel Filtration in Theory and Practice, Pharmacia, 1965, pp. 20–43.

Netherlands Milk and Dairy Journal, 1962, De Koning, pp. 210–216.

J. of Dairy Science, vol. 47, 1964, Morr et al., pp. 621–625.

J. of Dairy Research, vol. 31, 1964, Hill et al., pp. 291–295.

J. of Dairy Science, vol. 50, 1967, Morr et al., pp. 305–306.

J. of Dairy Science, vol. 51, 1968, Morr et al., pp. 1155–1160.

HOWARD E. SCHAIN, Primary Examiner

U.S. Cl. X.R.

260—123.5